United States Patent
Lavi et al.

(10) Patent No.: US 8,995,956 B2
(45) Date of Patent: Mar. 31, 2015

(54) SYSTEM AND METHOD FOR VEHICLE BASED CELLULAR OFFLOAD

(75) Inventors: Nadav Lavi, Ramat-Hasharon (IL); Ron Rotstein, Herzlia (IL); Kobi Jacob Scheim, Pardess Hanna (IL)

(73) Assignee: GM Global Technology Operations LLC, Detroit, MI (US)

( * ) Notice: Subject to any disclaimer, the term of this patent is extended or adjusted under 35 U.S.C. 154(b) by 90 days.

(21) Appl. No.: 13/241,873

(22) Filed: Sep. 23, 2011

(65) Prior Publication Data
US 2013/0078945 A1 Mar. 28, 2013

(51) Int. Cl.
*H04W 12/08* (2009.01)
*H04W 84/22* (2009.01)
*H04W 84/14* (2009.01)

(52) U.S. Cl.
CPC .............. *H04W 84/22* (2013.01); *H04W 84/14* (2013.01)
USPC ........................... 455/410; 343/711; 370/235

(58) Field of Classification Search
USPC ............ 455/410, 426.1, 566, 11.1, 187.1, 40, 455/411, 414.1–414.4, 422.1, 436–437, 455/452.2, 456.1, 507, 522, 450.16; 370/338, 235, 310, 331; 307/9.1; 343/711
See application file for complete search history.

(56) References Cited

U.S. PATENT DOCUMENTS

| | | | |
|---|---|---|---|
| 2008/0089288 A1* | 4/2008 | Anschutz et al. | 370/331 |
| 2008/0148374 A1* | 6/2008 | Spaur et al. | 726/6 |
| 2009/0073946 A1* | 3/2009 | Morita | 370/338 |
| 2009/0299857 A1* | 12/2009 | Brubaker | 705/14.66 |
| 2010/0020752 A1* | 1/2010 | Anschutz et al. | 370/328 |
| 2010/0027419 A1* | 2/2010 | Padhye et al. | 370/235 |
| 2010/0250106 A1* | 9/2010 | Bai et al. | 701/117 |
| 2011/0092237 A1* | 4/2011 | Kato et al. | 455/507 |
| 2011/0181106 A1* | 7/2011 | Kim | 307/9.1 |
| 2011/0255481 A1* | 10/2011 | Sumcad et al. | 370/329 |
| 2011/0260884 A1* | 10/2011 | Yi et al. | 340/870.02 |

(Continued)

FOREIGN PATENT DOCUMENTS

| | | |
|---|---|---|
| CN | 101958747 A | 1/2011 |
| CN | 102098708 A | 6/2011 |

OTHER PUBLICATIONS

Office Action CN application No. 201210353917.0 dated Nov. 21, 2014.

*Primary Examiner* — Khawar Iqbal
(74) *Attorney, Agent, or Firm* — Mark S. Cohen; Pearl Cohen Zedek Latzer Baratz LLP

(57) ABSTRACT

One or more vehicle communication systems associated with one or more vehicles may be activated. The one or more vehicles may, for example, include a gateway vehicle. A backhaul connection between a vehicle communication system associated with the gateway vehicle and a cellular infrastructure may be established. Signals from the cellular infrastructure may be received at the vehicle communication system associated with gateway vehicle. Using the vehicle communication system associated with the gateway vehicle, the signals received from the cellular infrastructure may be transmitted. Signals from one or more mobile devices may be received using the vehicle communication system associated with the gateway vehicle. The signals received from the one or more mobile devices may be transmitted to the cellular infrastructure using the vehicle communication system associated with the gateway vehicle.

15 Claims, 3 Drawing Sheets

(56) References Cited

U.S. PATENT DOCUMENTS

| | | | |
|---|---|---|---|
| 2011/0267205 A1* | 11/2011 | McClellan et al. | 340/936 |
| 2011/0269404 A1* | 11/2011 | Hu et al. | 455/67.11 |
| 2011/0294500 A1* | 12/2011 | Chang et al. | 455/426.1 |
| 2012/0158820 A1* | 6/2012 | Bai et al. | 709/202 |
| 2012/0196618 A1* | 8/2012 | Lowell et al. | 455/456.1 |
| 2012/0282932 A1* | 11/2012 | Yu et al. | 455/437 |
| 2012/0294275 A1* | 11/2012 | Krishnaswamy et al. | 370/331 |
| 2013/0069834 A1* | 3/2013 | Duerksen | 343/711 |

* cited by examiner

SYSTEM AND METHOD FOR VEHICLE BASED CELLULAR OFFLOAD

FIELD OF INVENTION

The present invention is related to vehicle based cellular communication using, for example, cellular infrastructure, vehicles, and other devices.

BACKGROUND OF THE INVENTION

Devices employing cellular communication systems and methods (e.g., cellular telephones, mobile computers and other mobile devices) are increasingly prevalent. The increase in number of mobile devices has increased the capacity demand and load on cellular networks. Typical cellular networks include stationary cellular antennas (e.g., a cellular tower including multiple cellular antennas) which may broadcast to and receive signals from mobile devices to facilitate communication between mobile devices. The quality of data transfer may, for example, be reduced when too many mobile devices transfer and receive data from a cellular antenna. The load on cellular networks may be the highest in areas of dense population (e.g., in cities). The number of vehicles (which may include cellular devices) parked in areas of dense population may also be higher.

Load on cellular network may be reduced through use of femto cells, Wi-Fi access points and other devices, which may communicate with mobile devices and transmit information to the cellular network. Femto cells, Wi-Fi access points, and other devices require electricity and typically must be connected to the operator network (e.g., via a wire link). The installation of femto cells, Wi-Fi access points, and other devices may not keep pace with the increase in cellular network demand and may not be installed based on real-time cellular coverage need. Thus, a vehicle cellular offload system or method may be needed.

SUMMARY OF THE INVENTION

One or more vehicle communication systems associated with one or more vehicles may be activated. The one or more vehicles may, for example, include a gateway vehicle. A backhaul connection between a vehicle communication system associated with the gateway vehicle and a cellular infrastructure may be established. Signals from the cellular infrastructure may be received at the vehicle communication system associated with gateway vehicle. Using the vehicle communication system associated with the gateway vehicle, the signals received from the cellular infrastructure may be transmitted. Signals from one or more mobile devices may be received using the vehicle communication system associated with the gateway vehicle. The signals received from the one or more mobile devices may be transmitted to the cellular infrastructure using the vehicle communication system associated with the gateway vehicle.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
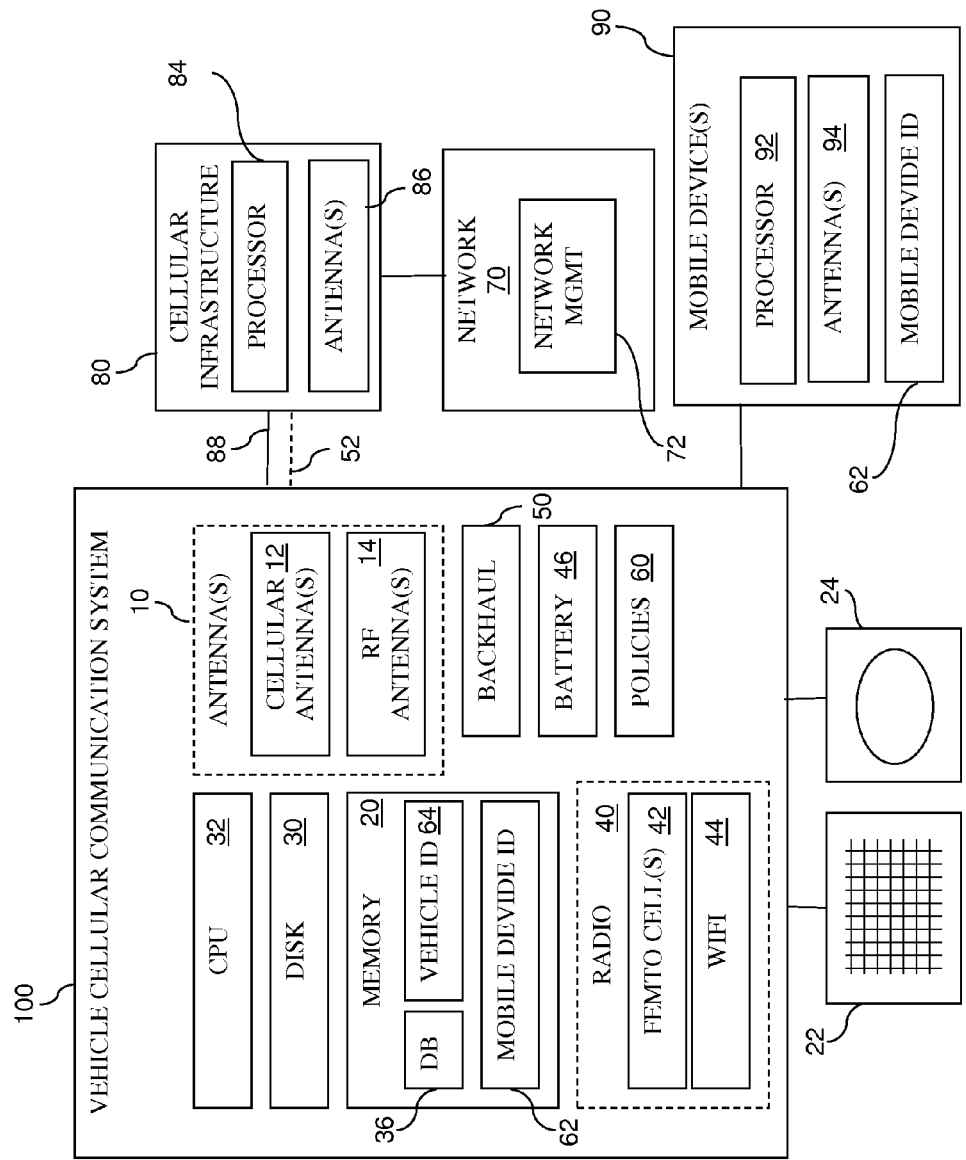
FIG. 1 is a schematic diagram of a vehicle with a vehicle communication system according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. It will however be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A vehicle communication system may facilitate or improve cellular communication and data transfer between mobile devices (e.g., cellular telephones, mobile computing devices, etc.) and a cellular network. From a plurality of vehicles, one or more vehicles may, for example, include vehicle communication systems. Vehicle communication systems may, for example, be similar to cellular base stations or cellular relay stations. Vehicle communication systems may, for example, establish a vehicle to mobile device connection with one or more mobile devices. Vehicle communication systems may, in some embodiments, transmit signals or information to and receive signals or information from mobile devices using a vehicle to mobile device connection. Vehicle communication systems may, for example, receive signals from one or more mobile devices and may transmit the signals from one or more mobile devices to cellular infrastructure (e.g., cellular tower, micro site, macro site, dedicated communication hub, base station, etc.) associated with an operator network (e.g., cellular communication network). Similarly vehicle communication system may, for example, receive signals from a cellular infrastructure and may transmit the signals received from cellular infrastructure to one or more mobile devices.

According to some embodiments, a vehicle communication system may include a backhaul module and/or other systems. A backhaul module may, for example, establish a backhaul connection with cellular infrastructure. Backhaul connection may, for example, be a wireless (e.g., cellular, etc.), wired, and/or other type of connection between vehicle communication system and cellular infrastructure. Cellular infrastructure may, in some embodiments, be a dedicated communication hub, whose primary purpose may be to transmit to and receive signals from vehicle communication systems.

A vehicle communication system may include a radio access system or module. A radio access system may, for example, be or may include one or more femto cells, Wi-Fi access points, or other systems of devices. A radio access system may, for example, transmit signals to one or more mobile devices and/or radio access systems associated with other vehicles. Similarly, a radio access system may, for example, receive signals from one or more mobile devices and/or radio access systems associated with other vehicles.

According to some embodiments, information or signals (e.g., transmitted from mobile devices to cellular infrastructure or from cellular infrastructure to mobile devices) may be transmitted between multiple vehicles in a multi-hop or mesh network. A multi-hop or mesh network may include a gateway vehicle and one or more network vehicles. In a multi-hop or mesh network, a gateway vehicle may establish a backhaul connection to cellular infrastructure or other device associated with operator network. A gateway vehicle may, for example, be determined by a network management system and may be a vehicle with the strongest or best backhaul link or connection to cellular infrastructure or has the best battery condition. One or more intermediate or network vehicles may, for example, be vehicles not directly connected to cellular infrastructure (e.g., directly transferring and/or receiving information from cellular infrastructure). A gateway vehicle and one or more network vehicles may, for example, establish a vehicle to vehicle connection. Similarly, network vehicles may, for example, establish vehicle to vehicle connections with other network vehicles.

According to some embodiments, one or more network vehicles may, for example, receive information from mobile device(s) and may transfer the signals to other network vehicles and/or gateway vehicles. One or more network vehicles may, for example, transfer information from one or more mobile devices to a gateway vehicle either directly or via other network vehicles. Gateway vehicle may, for example, transmit signals received from one or more mobile devices via one or more network vehicles to cellular infrastructure using a backhaul connection. A gateway vehicle may, in some embodiments, aggregate signals from multiple mobile devices and transmit an aggregated signal to cellular infrastructure. Similarly, cellular infrastructure may, for example, transmit signals intended for one or more mobile devices to gateway vehicle over a backhaul connection. A gateway vehicle may, for example, receive signals and transmit the signals to one or more network vehicles. One or more network vehicles may receive signals intended for mobile devices and may transmit the signals to other network vehicles or the mobile devices. Signals may, thus, hop from vehicle to vehicle prior to arriving at mobile device, cellular infrastructure, or another device.

According to some embodiments, vehicle communication systems may be activated or deactivated based on the volume of communication traffic or load in operator network, coverage area of operator network, power management in vehicles (e.g., battery life), vehicle owner preferences or policies (e.g., vehicle owner behavioral constraints), and other factors or information. For example, a vehicle communication system may transmit a signal to a cellular infrastructure or other device associated with operator network when vehicle is parked or at other times. A signal transmitted from a vehicle to cellular infrastructure may, for example, include vehicle location, vehicle identification parameters, vehicle battery life information, and other information or data. A network management system (e.g., associated with operator network, an infrastructure owner, or other system or network), a vehicle (e.g., gateway vehicle) or other device may, in some embodiments, determine whether to activate or deactivate vehicle communication systems. A network management system, vehicle (e.g., gateway vehicle) or other device may, in some embodiments, transfer mobile device cellular connections (e.g., mobile device connection context information) from vehicle to vehicle in a mesh or multi-hop vehicle network.

According to some embodiments, multiple vehicle communication systems may be arranged in a self organizing network (SON). Vehicle communication systems in an SON may, for example, be activated or deactivated to optimize power usage among the vehicles in SON. Cellular connectivity (e.g., between mobile device and vehicle communication systems) may, in some embodiments, be transferred from vehicle to vehicle to optimize vehicle battery life, reduce delay, improve cellular link conditions, optimize the cellular network, etc. Vehicle communication systems may for example run or execute keep-alive and/or leader selection protocols to ensure adequate or optimal cellular service in SON (e.g., within the geographic area of SON).

According to some embodiments, vehicle communication systems may be installed in a vehicle during manufacturing or as an aftermarket option. Vehicle owner or another person may, in some embodiments, determine whether vehicle communication system may be activated. In some embodiments, an operator network or another entity may provide vehicle owners incentives to activate vehicle communication system. For example, an operator network or another entity may offer a reduced vehicle purchase price, fuel discounts, cellular telephone service credits, reduced parking costs, or other incentives in exchange for vehicle owner agreement to activate or permission to activate vehicle communication system associated with vehicle owner's vehicle. In some embodiments, fee reduction incentives may be calculated as a function of utilized battery charge, offload enhancement measures, or other factors associated with the operation of vehicle communication system.

In some embodiments, a vehicular infrastructure owner may sell or lease use of vehicle communication systems to an operator network (e.g., a cellular network operator). Infrastructure owner may, for example, provide available resources (e.g., vehicle with vehicle communication systems) to operator network as necessitated or required by operator network (e.g., based on cellular network capacity, coverage, load, and/or other requirements). Infrastructure may maintain, manage, and update (e.g., using network management system) information related to available vehicle communication systems. Information related to available vehicle communication systems may, for example, be provided to operator network as needed, upon request, and/or for a fee.

FIG. 1 is a schematic diagram of a vehicle with a vehicle communication system according to an embodiment of the present invention. A vehicle (e.g., a car, truck, mobile cart, trailer, or another vehicle) may include (and thus may be associated with) vehicle communication system or module 100. Vehicle communication system 100 may, for example, transmit signals to, receive signals from, and/or operate in conjunction with cellular infrastructure 80 (e.g., cellular antenna tower, one or more cellular antenna(s), a dedicated communication hub, base station(s), or other mobile device communication infrastructure), and possibly other systems. For example, cellular infrastructure 80 may be a cellular network radio tower (e.g., multiple antennas, a macro site, micro site, etc.) connected to an operator network 70 (e.g., cellular provider network). In some embodiments, cellular infrastructure 80 may be dedicated communication hub(s). A dedicated communication hub may, for example, be connected to an operator network 70 (e.g., cellular provider network) and may, for example, function primarily or exclusively to transmit to and receive signals from one or more systems 100 and to transmit and receive signals to and from operator network 70.

One or more antenna(s) 10, for example, cellular antenna(s) 12, radio frequency (RF) antenna(s) 14, or other types of antenna(s) may be attached to, connected to, or associated with the system 100, vehicle, and/or other devices. Antenna(s) 10 may, for example, send and receive signals, information, communications, and/or data from antenna(s) 10 associated with other vehicle(s), cellular infrastructure 80 (e.g., cellular infrastructure antenna(s) 86), mobile device(s) 90 (e.g., mobile device antenna(s) 94), or other devices.

One or more batteries 46 may be associated with system 100 and/or vehicle. Batteries 46 may, for example, be a battery associated with vehicle (e.g., a car battery, vehicle battery, automotive battery, etc.). Batteries 46 may, for example, include one or more low-voltage (e.g., 12 volt) batteries used for low-power tasks (e.g., windshield wipers, power seats, etc.), one or more high-voltage (e.g., 300 volts or greater) batteries used for high-power tasks (e.g., propelling vehicle (e.g., in an electric vehicle), etc.) or other types of batteries. Batteries 46 may, for example, provide power to system 100, components of system 100 (e.g., backhaul component(s) 50, radio access component(s) 40, femto cell(s) 42, Wi-Fi module(s) 44, antenna(s) 10, and/or other components).

According to some embodiments, system 100 may transfer signals to and receive signals from one or more mobile devices 90. Mobile devices 90 may be for example cellular telephones, portable computers, cellular modems, cellular devices within vehicles, or other devices.

One or more femtocells or femto cells 42 (e.g., cellular femto cell or other type of femto cell) may, in some embodiments, be included in and/or associated with system 100. Femto cell(s) 42 may, for example, be relatively small or micro cellular base stations and may operate similarly or identically to cellular infrastructure 80. Femto cell(s) 42 may, for example, operate in conjunction with antenna(s) 10 by transmitting signals to and/or receiving signals from mobile device(s) 90, cellular infrastructure 80, system(s) 100 associated with other vehicle(s), and possibly other devices. Femto cell(s) 42 may, for example, transmit and receive signals or facilitate a communication session (e.g., between mobile device 90 and other devices) by utilizing communication protocols and technologies. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, third generation partnership project (3GPP) Cellular Standards or other standards. For example, signals may be broadcasted and received utilizing code division multiple access (CDMA), CDMA 2000, Dedicated short-range communications (DSRC) standards, wireless gigabit alliance (WiGig) (e.g., 60 gigahertz WiGig), 3GPP Cellular Standards or other communications protocols, standards and technologies.

One or more Wi-Fi access-points or wireless access points 44 may, in some embodiments, be included in and/or associated with system 100. System 100 may, for example, be a Wi-Fi access point 44 or include Wi-Fi access point functionality. Wi-Fi access point 44 may, for example, transmit and receive signals or provide a communication session by utilizing communication protocols and technologies. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, 3GPP Cellular Standards or other standards. For example, signals may be broadcasted and received over a Wi-Fi network, local multipoint distribution service (LMDS), WiMAX, Bluetooth® network, Institute of Electrical and Electronics Engineers, Inc. (IEEE) 802.xx network, personal area network (PAN), and/or other short range communication network.

Backhaul module 50 may, for example, aggregate data, and/or information from one or more vehicles or mobile devices. The aggregated data may, for example, be transmitted, transferred, and/or broadcast to cellular infrastructure 80 over or using backhaul connection 52. A backhaul module and/or components 50 may, in some embodiments, be used to establish a backhaul connection 52 between system 100 and cellular infrastructure 80. Backhaul connection 52 may, for example, be an intermediate link between a network backbone and other sub-networks or equipment within the network (e.g., operator network 70). Backhaul connection 52 may, for example, be a wireless (e.g., Wi-Fi, cellular communications connection, etc.), wire link 88 (e.g., Ethernet, digital subscriber line (DSL), data bus, coaxial cable, optical connection, twisted pair cable, universal serial bus (USB), category 5 cable, parallel port connector, etc.), and/or other type of connection between system 100 (e.g., associated with a vehicle) and cellular infrastructure 80.

Vehicle information network system 100 may include one or more processor(s) or controller(s) 32, memory 20, long term storage 30, input device(s) or area(s) 22, and output device(s) or area(s) 24. Input device(s) or area(s) 22 may be, for example, a touchscreen, a keyboard, microphone, pointer device, button(s), or other device. Output device(s) or area(s) 24 may be, for example, a display, screen, audio device such as speaker or headphones, or other device. Input device(s) or area(s) 22 and output device(s) or area(s) 24 may be combined into, for example, a touch screen display and input which may be part of system 100.

System 100 may include one or more databases 36, which may include mobile device identification data 62, vehicle identity parameter(s) 64 (e.g., an identity parameter associated with vehicle), vehicle owner preferences or policies 60, and or other information or data. Databases 36 may be stored all or partly in one or both of memory 20, long term storage 30, or another device.

Processor or controller 32 may be, for example, a central processing unit (CPU), a chip or any suitable computing or computational device. Processor or controller 32 may include multiple processors, and may include general-purpose processors and/or dedicated processors such as graphics processing chips or digital signal processors (DSPs). Processor 32 may execute code or instructions, for example, stored in memory 20 or long-term storage 30, to carry out embodiments of the present invention. Processor 32 may, for example, be or may include a wireless network interface controller.

Memory 20 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 20 may be or may include multiple memory units.

Long term storage 30 may be or may include, for example, a hard disk drive, a flash drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 2:
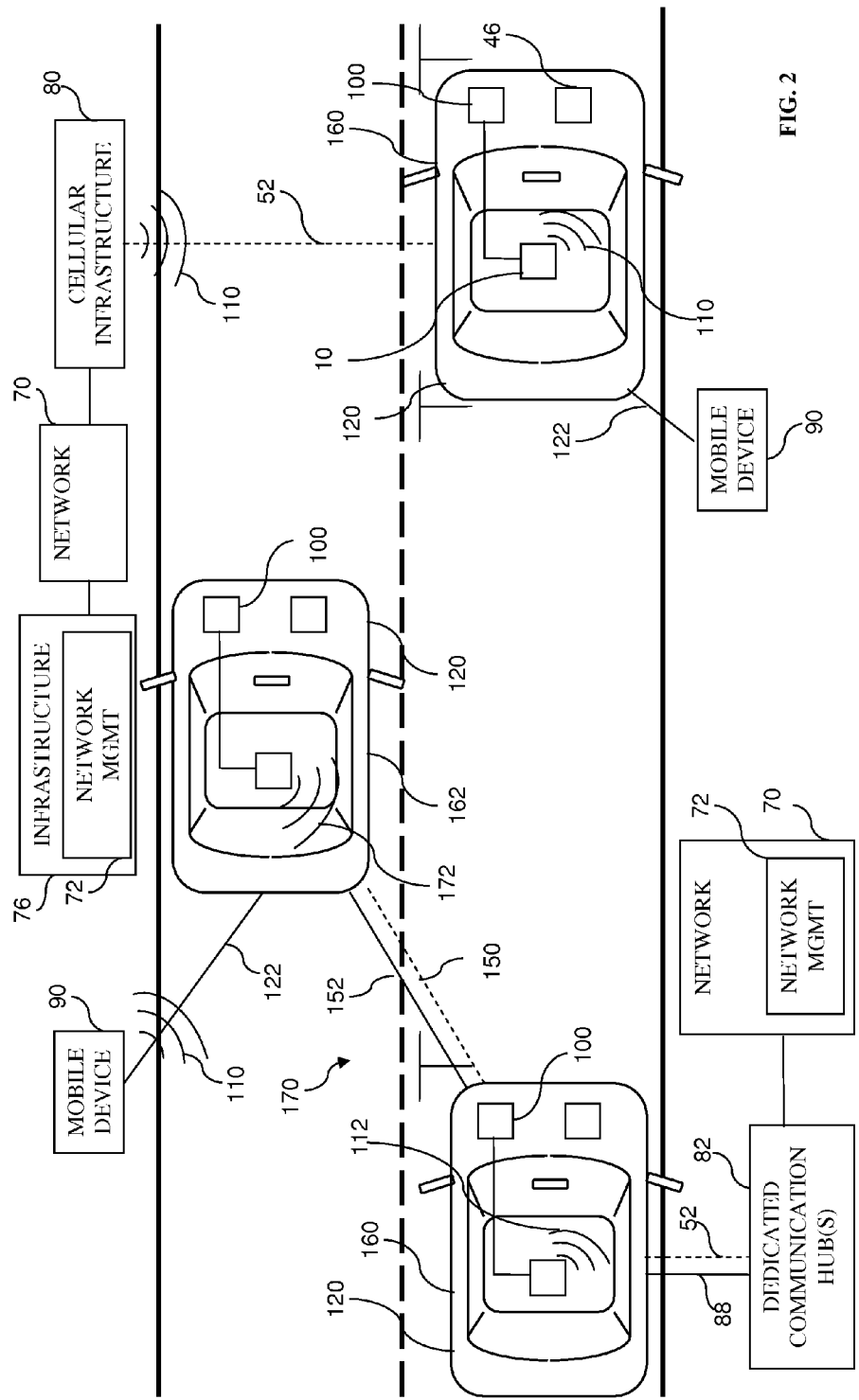
FIG. 2 is a schematic diagram of multiple vehicle communication systems in a network according to an embodiment of the present invention.

FIG. 2 is a schematic diagram of multiple vehicle communication systems in a network according to an embodiment of the present invention. One or more vehicle(s) 120 (e.g., gateway vehicle(s) 160, network vehicle(s) 162, and/or other vehicles) may include a vehicle communication system 100 or a system similar to system 100. In some embodiments, vehicle communication system 100 may be or may include a computing device (e.g., including processor 32 and other components) mounted on the dashboard of the vehicle 120, in passenger compartment, in vehicle trunk, engine compartment, and/or in another location. In alternate embodiments, vehicle communication system 100 may be located in another part of the vehicle 120, may be located in multiple parts of the vehicle 120, or may have all or part of its functionality remotely located (e.g., in a remote server or in a portable computing device such as a cellular telephone (e.g., a cellular telephone inside vehicle 120)).

One or more antenna(s) 10 may be associated with vehicle(s) 120. Antenna(s) 10 may, for example, be affixed, attached to, or fastened to a portion of vehicle(s) 120. Antenna(s) 10 may, for example, be installed on roof of vehicle(s) 120 or other locations in vehicle(s) 120. Antenna(s) 10 may broadcast information to and receive information from cellular infrastructure 80 (e.g., to and from cellular infrastructure antenna(s) 86), other vehicles 120 (e.g., antenna(s) 10 associated with systems 100 in other vehicles), mobile device(s) 90 (e.g., mobile device antenna(s) 94), and possibly other devices. Antenna(s) 10 may, for example, be connected to or associated with system 100 and may transmit or transfer data, or information to system 100 via, for example, a wire link (e.g., a controller area network (CAN) bus, Flexray, Ethernet) or a wireless link within vehicle 120.

Cellular infrastructure 80 (e.g., a cellular tower, dedicated communication hub 82, cellular station, base transceiver station (BTS), macro site, micro site, base stations, cell sites etc.) may, for example, broadcast, transmit, and/or output signal(s) 110 (e.g., a cellular signal, radio frequency signal, or other signal(s)). Cellular infrastructure 80 and operator network 70 may typically be fixed and not easily moveable, and not attached to or within a vehicle. Signal(s) 110 broadcast or transmitted from cellular infrastructure 80 may, for example, be received by system 100 associated with vehicle(s) 120 (e.g., a car, truck, or another vehicle). Signal(s) 110 from cellular infrastructure 80 may, for example, be received by antenna(s) 10 (e.g., cellular antenna(s) 12, RF antenna(s) 14, or other antenna(s)) associated with system 100. Signal(s) 110 may, in some embodiments, be transferred or transmitted from cellular infrastructure 80 (e.g., a dedicated communication hub) and received at system 100 via a wire link 88 (e.g., a data bus, coaxial cable, twisted pair cable, universal serial bus (USB), category 5 cable, optical connection, wireless connection, parallel port connector, or other hard connection). Cellular infrastructure 80 may, in some embodiments, transmit signals 110 to one or more mobile devices 90, systems 100, and potentially other devices and systems.

Cellular infrastructure 80 (e.g., dedicated communication hub 82, etc.), may, for example, be connected to, communicate with, or otherwise be associated with an operator network 70 (e.g., a cellular service provider network, cellular communication network, telecommunications network, the internet, computer network, voice over internet protocol (VoIP) network, voice over broadband (VoBB) network, or other type of network), and/or other cellular infrastructure 80, and possibly other devices or systems. Cellular infrastructure 80 may, for example, transfer data, information, and/or signals 110 transferred over or using a cellular telephone network to system 100, mobile device(s) 90, and/or other devices or systems. Signals 110 may, for example, represent or include information or data to facilitate digital communications (e.g., voice telephone conversations), data transfer, or other cellular related functions. For example, cellular infrastructure 80 may transmit signals 110 to system 100 and receive signals 110 from system 100 to enable cellular communication, data transfer, or other communication among mobile device(s) 90, computing devices, telephones, and/or other devices using or over operator network 70 or other type of network.

According to some embodiments, one or more systems 100 associated with vehicles 120 may, for example, include a radio access system or module 40. Radio access system 40 may, for example, be or may include femto cells 42, Wi-Fi access points 44, and/or other radio access systems 40. Radio access module or system 40 may, for example, establish a vehicle to mobile device connection or link 122. Radio access module or system 40 may, for example, broadcast signals 110 to and receive signals 110 from one or more mobile devices 90, systems 100 associated with other vehicle(s) 120, or other devices. Radio access system 40 may, for example, include similar functionality to traditional cellular infrastructure (e.g., macro site, micro site, cellular tower, or other device) in facilitating information transfer between mobile device(s) 90 and other devices on, communicating via, registered to, or associated with operator network 70.

According to some embodiments, mobile device 90 may communicate with (e.g., transfer signals 110 to and receive signals 110 from) system 100 associated with vehicle 120 (e.g., using vehicle to mobile device connection 122). Mobile device 90 may, for example, establish a communication or cellular connection with system 100 by transmitting or broadcasting signals or information 110 (e.g., from an antenna associated with mobile device 90). System 100 may, for example, receive signals or information 110 broadcast from mobile device 90 (e.g., via antenna(s) 10 associated with system 100). Mobile device 90 may, for example, transmit or broadcast signals 110 including mobile device identification information 62 (e.g., mobile device network address, profile or other information) and other information. System 100 may, for example, receive mobile device identification information 62 and may broadcast or transmit a response signal or signals 110 to establish a cellular communication connection or session between mobile device 90 and system 100. System 100 may, for example, transfer mobile device identification information 62 to cellular infrastructure 80. Once a cellular communication connection or session has been established, information representing or including communications data (e.g., voice or sound data input from user, text communication data, Internet data, multimedia files, and/or other information or data typically transferred from and to mobile device(s) 90 over or using a cellular communication or operator network 70) may be transmitted to radio access system 40 from mobile device 90 and received by radio access system 40.

According to some embodiments, a backhaul module or components 50 may be used to establish a backhaul connection 52 (e.g., backhaul communication link, an intermediate link between for example a network backbone and other sub-networks or equipment within the network) between system 100 and bases station(s) 80. According to some embodiments, mobile devices 90 may, for example, transmit signals 110 to and receive signals 110 from radio access system 40. Signals 110 from mobile devices 90 may, for example, be transmitted from system 100 to operator network 70 using a backhaul connection 52 (e.g., through cellular infrastructure 80). Similarly signals 110 may, for example, be transmitted from network 70 to system 100 over backhaul connection 52 and transmitted from system 100 (e.g., through cellular infrastructure 80) to mobile device using radio access system 40. Other information and data communication systems and methods may be used.

According to some embodiments, backhaul connection 52 may, for example, be used to transmit information over a wireless, wire link 88 (e.g., Ethernet, digital subscriber line (DSL), data bus, coaxial cable, twisted pair cable, universal serial bus (USB), category 5 cable, parallel port connector, data over power line, etc.), and/or other type of connection between system 100 and cellular infrastructure 80. In some embodiments, system 100 and cellular infrastructure 80 may establish a wireless backhaul connection 52 (e.g., backhaul communication link). System 100 and cellular infrastructure 80 may, for example, transfer information over wireless backhaul connection 52 using operator network 70 cellular client and/or cellular network connection. Backhaul module 50 may, for example, transfer signals 110 to cellular infrastructure 80 using femto cell(s) 42, Wi-Fi module(s) 44, a smart grid, or other device or module. Femto cell(s) 42, Wi-Fi module(s) 44 (e.g., wireless access point(s), Wi-Fi access point(s)), a smart grid, or other device or module may, for example, be used to establish a backhaul connection or link 52 between system 100 and cellular infrastructure 80. Backhaul module 50 may, for example, communicate or facilitate communication with cellular infrastructure 80 by transmitting and receiving signals using antenna(s) 10 (e.g., cellular antenna(s) 12, RF antenna(s) 14, or other antennas) associated with vehicle 120 and/or system 100. Antenna(s) 10 may, for example, broadcast and receive signals using a cellular communication protocol or standard used by or associated with cellular infrastructure 80 and/or operator network 70.

Backhaul module 50 may, in some embodiments, communicate with cellular infrastructure 80 by broadcasting and receiving signal(s), information, or data 110 using multiple antenna(s) 10. Backhaul module 50 may, for example, using multiple antenna(s) 10 communicate with cellular infrastructure 80 using multiple-in and multiple-out (MIMO) methods and systems. MIMO methods and systems may, for example, transmit and receive signal(s) 110 using two or more antenna(s) 10 associated with system 100 and two or more antenna(s) associated with cellular infrastructure 80. MIMO systems and methods may, for example, transmit and receive signals over multiple channels established between system 100 and cellular infrastructure 80. For example, signals 110 may be transmitted and received over multiple input channels and multiple output channels.

According to some embodiments, antenna(s) 10 associated with system 100 may be high gain antenna(s) 10 and/or may, for example, operate at a higher gain than antenna(s) associated with a mobile device(s) 90. By operating at higher gain relative to mobile device 10 and other antennas and employing MIMO, methods and systems, and other smart antenna systems and methods, antenna(s) 10 may provide improved channel conditions, lower loading factor(s), and a more robust and stable connection to operator's network 70 (e.g., through cellular infrastructure 80) than mobile devices 10 or other devices or systems.

According to some embodiments, system(s) 100 may establish a backhaul connection 52 with a dedicated communication hub 82 (e.g., a dedicated base station or dedicated cellular infrastructure). Dedicated communication hub 82 may, for example, be or be associated with a cellular infrastructure 80. Dedicated communication hub 82 may, for example, function primarily to provide a backhaul connection 52 between vehicles 120 and operator's network 70. A dedicated communication hub 82 may, for example, communicate (e.g., transmit signals to and receive signals from) with systems 100 using DSRC technology, WiGig (e.g., 60 GHz WiGig), and/or other wireless communication technologies. A dedicated communication hub 82 may, in some embodiments, transfer signals 110 to and receive signals 110 from systems 100 using a wire link 88 or other type of connection. Multiple dedicated communication hub(s) 82 may, for example, be deployed or located in an arrangement (e.g., within predefined distance of one another). Multiple dedicated communication hub(s) 82 may, for example, be located in an arrangement to ensure a predefined level of service coverage across a geographic area.

According to some embodiments, signals 110 from radio access system 40 may be aggregated by backhaul module 50 and transferred to cellular infrastructure 80 (e.g., dedicated communication hub 82 or other device associated with network 70). For example, signals 110 transmitted to system 100 from one or more mobile devices 90, other systems 100 (e.g., in a mesh or multi-hop network), and possibly other devices may be aggregated by backhaul module 50. Backhaul module 50 may, for example, aggregate information or signals 110 by combining, transforming, or compressing multiple signals 110 from one or more mobile devices 90, systems 100, or other devices to reduce the bandwidth or total signals 110 transmitted over backhaul connection 52. Aggregated signals or information 112 (e.g., signal(s) 110 including information from mobile devices 90, systems 100, and other devices) may, for example, be transmitted over backhaul connection 52 to cellular infrastructure 80. Transferring aggregated signals or information 112, including signals from multiple devices, may increase the efficiency of data transfer from system 100 to cellular infrastructure 80 and network 70.

Cellular infrastructure 80 may transfer aggregated signals 112 to system 100. Aggregated signals 112 may, for example, include information to be broadcast to multiple mobile devices 90. Backhaul module 50 may, for example, de-combine, de-aggregate, decompose, decompress and/or convert an aggregated signal 112 from cellular infrastructure 80 into one or more signals 110. Decompressed signals 110 may, for example, transferred (e.g., via radio access module 40) to mobile devices 90, vehicles 120, or other devices.

According to some embodiments, multiple vehicles (e.g., including associated systems 100) may transfer information 110 via a mesh, multi-hop, or ad hoc vehicle network 150. Mesh vehicle network 150 may, for example, include multiple vehicles such as automobiles, trucks, motorcycles, non-motorized vehicles, etc. (e.g., one or more gateway vehicles 160 and one or more network vehicles 162). Gateway vehicle(s) 160 and network vehicle 162 may, for example, include systems 100. A gateway, backhaul, or hub vehicle 160 in mesh vehicle communication network 150 may, for example, be connected, typically wirelessly by a wireless backhaul connection 52, (e.g., transfer signals 110 to and receive signals 110 from) to cellular infrastructure 80 via backhaul connection 52 or other type of connection. Network vehicles 162 may, in some embodiments, not be connected to cellular infrastructure (e.g., may not be connected to cellular infrastructure 80 via a backhaul connection 52). Gateway vehicle 160 and one or more network vehicles 162 may establish a vehicle to vehicle connection 152. Similarly network vehicles 162 may establish vehicle to vehicle connections 152 with other network vehicle(s) 162.

According to some embodiments, network vehicles 162 (e.g., system 100 associated with network vehicles 162) may transmit signals 110 to and receive signals 110 from cellular infrastructure 80 via a gateway vehicle 160. System 100 associated with gateway vehicle 160 may, for example, function as a hub or connection to cellular infrastructure 80. Gateway vehicle 160 may, in some embodiments, be chosen or determined (e.g., by network management module 72, system(s) associated with vehicle, or other devices) to optimize signals, communications, battery 46 life or level (e.g., in batteries 46 associated with system(s) 100), cellular link conditions, cellular load, signal quality, and/or other factors or policies. Gateway vehicle 160 may, in some embodiments, be chosen or determined based on quality of backhaul connection or link 52. System 100 associated with gateway vehicle 160 may, for example, have best backhaul connection to cellular infrastructure 80 (e.g., strongest signal quality, least delay, best cellular link conditions, etc. among multiple vehicles in mesh network 150).

According to some embodiments, in a mesh vehicle network 150, signals 110 (e.g., information from operator network 70) may, for example, be transmitted from cellular infrastructure 80 to gateway vehicle 160, from gateway vehicle 160 to one or more network vehicles 162 (e.g., over a vehicle to vehicle connection 152), from one or more network vehicles 162 to one or more mobile devices 90 (e.g., over a vehicle to mobile device connection 122), and/or from one or more network vehicles 162 to one or more other network vehicles 162 (e.g., over a vehicle to vehicle connection 152). For example, gateway vehicle 160 may receive signals 110 from cellular infrastructure 80 (e.g., via backhaul connection 52) and gateway vehicle 160 may rebroadcast, retransmit, or transmit signals 110 to network vehicles 162 (e.g., using radio access system 40), mobile devices 90, and/or possibly other devices. Network vehicles 162 may, for example, receive signals 110 from gateway vehicle 160 or other network vehicles 162 and may broadcast signals 110 to mobile device(s) 90, other network vehicles 162, or possibly other devices. Similarly signals 110 may, for example, be transferred from one or more mobile devices 90 to one or more network vehicles 162, from one or more network vehicles 162 to gateway vehicle 160 and from gateway vehicle 160 to cellular infrastructure 80. In some embodiments, signals 110 (e.g., from mobile device 90) may be transferred through multiple network vehicles 162 (e.g., from network vehicle 162 to network vehicle 162) to a gateway vehicle 160. For example, from a first network vehicle 162 to a second network vehicle 162 and from a second network vehicle 162 to other network vehicle(s) 162 or to a gateway vehicle 160.

According to some embodiments, signals 110 transmitted in a mesh vehicle network may be aggregated. For example, a first network vehicle 162 may communicate with multiple mobile device(s) 90. First network vehicle 162 may, for example, aggregate signals 110 from each mobile device 90 and may transmit an aggregated signal 112 to a second network vehicle 162. Second network vehicle 162 may, for example, receive aggregated signal 112 from first network vehicle 162. Second network vehicle 162 may, for example, communicate with multiple mobile device(s) 90 (e.g., separate mobile devices 90 from mobile devices communicating with first network vehicle 162). Signals 110 from multiple mobile devices 90 communicating with second network vehicle 162 and aggregate signal 112 received from first network vehicle 162 may be aggregated at transmitted to another network vehicle 162, gateway vehicle 160, or potentially another device. Aggregated signals 112 may, for example, hop from vehicle to vehicle until signal reaches gateway vehicle 160.

According to some embodiments, backhaul module 50 associated with gateway vehicle 160 may, for example, aggregate signals 110 and/or aggregated signals 112 from one or more vehicles 120 (e.g., network vehicles 162), mobile devices 90, and possibly other devices. Aggregated signals 112 may, for example, be transferred to cellular infrastructure 80 (e.g., cellular tower, dedicated communication hub 82, or other device).

As discussed herein, transferring information 110 from network vehicle 162 to network vehicle 162 or network vehicle 162 to gateway vehicle 160 and vice versa may, for example, mean transferring information from system 100 associated with a vehicle to a system 100 associated with another vehicle.

According to some embodiments, a vehicular gateway (e.g., systems 100 associated with a gateway vehicle 160 and/or multiple network vehicles 162) may be controlled by or from cellular infrastructure 80 using dedicated applications associated with an operator network operation and management system or module 72. Network management module 72 may, for example, be associated with operator network 70, infrastructure owner 76, or another system or entity. Network management module 72 may, for example, control signal transfer from vehicle to vehicle (e.g., between gateway vehicles 160 and network vehicles 162, between multiple network vehicles 162, etc.) and between mobile device(s) 90 and vehicles. Network management module 72 may, in some embodiments, control the activation and deactivation of vehicles (e.g., gateway vehicles 160 and network vehicles 162). Network management module 72 may, for example, control the organization of vehicles (e.g., in a mesh and/or multi-hop network 150, self organizing network (SON) 170, or other type of network).

According to some embodiments, system(s) 100 (e.g., associated with vehicle(s) 120) may be activated or deactivated by operator network 70, by infrastructure owner 76, gateway vehicle 160, another vehicle 120, or other device or system. Infrastructure owner 76 may, for example, be associated with vehicle 120 manufacturer, dealer, or other entity. Operator network 70 or infrastructure owner 76 may, for example, include or be associated with a vehicle network management module or system 72 (e.g., network management module). Network management module 72 may, for example, determine whether to activate or deactivate specific systems among systems 100 based on the volume of communication traffic or load in operator network 70, coverage area of operator network 70, power management in vehicles 120, vehicle owner preferences or policies 60 (e.g., vehicle owner behavioral constraints), and other factors or information. Network management module 72 may, for example, activate or deactivate system(s) 100 associated with vehicles by sending signals 110 to vehicle 120 (e.g., via cellular infrastructure 80 or dedicated communication hubs 82). System 100 may receive signal 110 and may be activated based on the signal 110.

According to some embodiments, a vehicle owner may activate or deactivate system 100 associated with owner's vehicle 120. System 100 may, for example, be activated or deactivated by owner using input device 22 or another device.

Network management module 72 may, for example, communicate with vehicle(s) 120 to determine whether to fully or partially activate or deactivate systems 100 associated with vehicle(s) 120. A vehicle 120 may, in some embodiments, register with network management module 72 when parked or at another time. Vehicle 120 may, for example, register with operator network 70 by broadcasting a signal 110 including a vehicle identity parameter 64 (e.g., an identity parameter associated with vehicle), location of vehicle 120, vehicle battery 46 level, and/or other information to cellular infrastructure 80. Cellular infrastructure 80 may receive information 110 from system 100 and transmit information 110 to operator network. Network management module 72 (e.g., associated with operation network 70) may, for example, determine based on information 110 and other factors whether to activate system 100 associated with vehicle 120.

According to some embodiments, network management module 72 may determine whether to activate system 100 associated with vehicle 120 based on the volume of communication traffic or load in operator network 70 (e.g., in the vicinity of or area of vehicle 120) and/or other factors. If the volume or amount of communication traffic over operator network 70 (e.g., between mobile device(s) 90 and cellular infrastructure 80 and/or between mobile device(s) 90 and systems 100 associated with vehicles 120) is high or above a predefined threshold in an area surrounding vehicle 120 (e.g., a geographic area in the vicinity of vehicle 120), system 100 associated with vehicle 120 may be activated by network management module 72, operator network 70, system 100 associated a vehicle (e.g., gateway vehicle 160), or another device. In some embodiments, if operator network 70 capacity and/or load necessitate additional coverage, one or more vehicle communication systems 100 may be activated. Operator network 70, network management module 72, gateway vehicle 160 or another device may, for example, activate system 100 by broadcasting or sending a signal 110 from cellular infrastructure 80 or gateway vehicle 160 to vehicle system 100. System 100 may receive signal 110 and may be activated based on the signal 110.

According to some embodiments, network management module 72 may determine whether to activate system 100 associated with a vehicle 120 based on vehicle power consumption, vehicle battery 46 charge level (e.g., remaining vehicle battery 46 life), and/or other factors. Vehicle 120 may, for example, broadcast vehicle battery level information to operator network 70 (e.g., via cellular infrastructure 80). Operator network 70 may, for example, receive vehicle battery level information. If vehicle battery 46 level is above a predefined threshold, system 100 associated with vehicle 120 may, for example, be activated by operator network 70. The predefined threshold vehicle battery 46 level may, for example, be specified by the owner of vehicle 120, be determined by network management module 72, be a function of the parking time (e.g., the time vehicle 120 is parked and system 100 is activated), and/or determined during vehicle testing, manufacturing, or at another time via other methods.

According to some embodiments, network management module 72 may determine whether to activate system 100 based on vehicle owner preferences or policies 60 (e.g., vehicle owner policies). Vehicle owner may, for example, input vehicle owner policies or preferences 60 or information representing owner policies 60 into system 100 (e.g., using input device 22 or another device). Vehicle owner preferences or policies 60 may include limitations on system 100 activation or deactivation based on, for example, number of vehicle occupants (e.g., whether passengers are in vehicle 120), the location of vehicle 120 (e.g., geographic location), time of day, vehicle owner personal preferences, or other information. Vehicle owner preferences 60 may, for example, restrict activation of system 100 when passengers are in the vehicle (e.g., one or more occupants are in vehicle). The number of passengers in the vehicle may, for example, be determined using vehicle occupant detection sensors or other devices. Vehicle owner policies 60 may, for example, restrict or limit activation or deactivation of system 100 based on the location of vehicle 120 (e.g., geographic location). For example, vehicle owner may specify that system 100 not be activated when vehicle is near vehicle owner's house (e.g., within a pre-defined distance of vehicle owner's house) or another location. Vehicle owner policies 60 may, for example, restrict or limit activation or deactivation of system 100 based on the time of day. For example, vehicle owner policies 60 may limit activation or deactivation of system 100 during the day, at times when driver is typically in vehicle 120 (e.g., driver's typical commuting times), or at another time. Vehicle owner policies 60 may, in some embodiments, restrict or limit activation or deactivation of system 100 for a specified time period (e.g., at all times, a pre-defined length of time, or another time period). System 100 may, in some embodiments, be activated (e.g., by network management module 72) if the vehicle owner policies 60 would not be violated (e.g., vehicle owner policies do not restrict activation of system 100).

According to some embodiments, network management module 72 may control reallocate, hand-off, or handover coverage between among systems 100. This control may be performed by signals sent between module 72 and specific systems 100 based on for example information such as status, data, or other information sent from systems 100 to module 72. A system 100 may, for example, be deactivated by network management module 72, by system 100 malfunction, when vehicle 120 travels outside range of cellular infrastructure 80, by failure of a component of system 100, or at other times or for other reasons. Network management module 72 may, for example, handover or hand off cellular network coverage from a deactivated or soon to be deactivated system 100 (e.g., associated with a first vehicle) to an active system 100 (e.g., associated with a second vehicle). For example, network management module 72 may, for example, handover cellular service by activating system 100 associated with a vehicle. A system 100 associated with a second vehicle may, for example, be activated simultaneously or shortly after system 100 associated with first vehicle is deactivated. Cellular network or cellular service coverage may be seamlessly transferred from one or a first system 100 to another or a second system 100.

Network management module 72 may, for example, prepare for or anticipate deactivation of a system 100 to ensure cellular coverage redundancy. Operator network management module 72 may, for example, transmit to a second system 100, mobile device identification information 62, cellular communication context information, and other information associated with mobile device(s) 90 communicating with a first system 100. Second system 100 (e.g., associated with a second vehicle 12) may, for example, receive mobile device identification information 62. If a first system 100, with which mobile device(s) 90 are communicating, is deactivated or fails, second system 100 may, for example, be activated. Second system 100 may, for example, transmit signals 110 to and receive signals 110 from mobile device 90 to enable cellular communication or data transfer with minimal interruption or disruption.

According to some embodiments, network management module 72 may be associated with infrastructure owner 76. Infrastructure owner 76 may, for example, operate in conjunction with operator network 70. In some embodiments, operator network 70 (e.g., a cellular service provider) may purchase coverage from infrastructure owner 76 (e.g., vehicle manufacturer). Infrastructure owner 76 may, for example, activate and deactivate systems 100 associated with vehicles 120 (e.g., using network management module 72) based on operator network 70 need and/or negotiations and agreements between operator network 70 and infrastructure owner 76. Other arrangements may be used.

According to some embodiments, network management module 72 may be associated with gateway vehicle 160 or another vehicle 120 and may perform all or some of the functions of a network management module 72 associated with operator network 70, infrastructure owner 76, or other systems or devices.

According to some embodiments, multiple vehicles 120 with associated systems 100 and cellular infrastructure 80 (e.g., cellular communication tower(s), cellular antenna(s)) may be organized in, operate as, and/or form a self organizing network (SON) 170 (e.g., quasi-static self organizing network). Multiple vehicles 120 and cellular infrastructure 80 may, for example, operate similarly to a traditional cellular tower array, wherein systems 100 associated with vehicle 120 and cellular infrastructure may be analogous to cellular towers or nodes.

According to some embodiments, multiple systems 100 in an SON 170 may exchange information related to vehicle battery 46 level, system 100 energy consumption, and/or other information related to system 100 power management. Systems 100 may, for example, transmit power management related information to systems 100 associated with other vehicles 120, to cellular infrastructure 80 and operator network 70, and/or other devices or systems. Based on power management information, systems 100 (e.g. processor 32), network management system 72, or other devices or systems may activate or deactivate systems 100 associated with vehicles 120. For example, if a battery 46 providing energy to a first system 100 is below a threshold battery 46 level, system 100 may broadcast information to other systems 100 in SON 170, cellular infrastructure 80 (e.g., associated with operator network 70), and/or other devices. First system 100 may, in some embodiments, be deactivated (e.g., by operator network management module 72, other systems 100, or another device) and a second system 100 may be activated or cellular coverage may be handed off to a second system 100.

Systems 100 in an SON 170 may be operated according to protocols which ensure redundancy and serviceability in the cellular network coverage. In some embodiments, systems 100 may function according to a keep-alive, heart beat, or other protocols. System 100 may, for example, broadcast or transmit a keep-alive signal 172 (e.g., keepalive signal or information) to cellular infrastructure 80 (e.g., connected to operator network 70), other systems 100 (e.g., connected to other systems 100 or cellular infrastructure 80), or other devices. Keep-alive signals 172 may, for example, be broadcast by system 100 to notify other systems 100, cellular infrastructure 80, operator network 70, operator network management module 72, and/or other devices that system 100 is active and may be deployed to communicate with mobile device(s) 80. System 100 may, for example, broadcast a keep-alive signal 172 when system 100 is active but not communicating with mobile device(s) 90.

Figure 3:
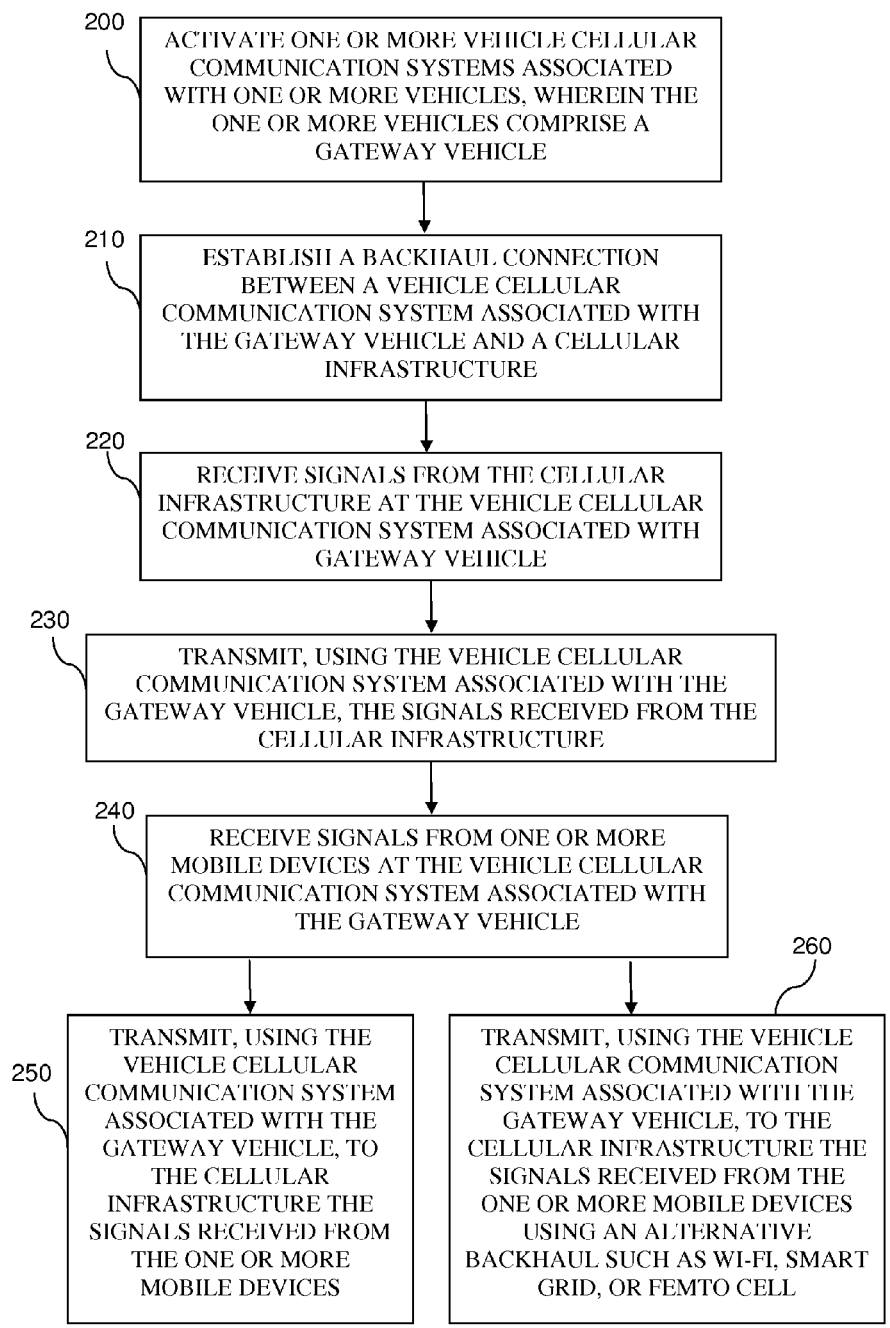
FIG. 3 is a flowchart of a method according to embodiments of the present invention.

FIG. 3 is a flowchart of a method according to embodiments of the present invention. In operation 200, one or more vehicle communication systems (e.g., vehicle communication system 100 of FIG. 1) associated with one or more vehicles (e.g., vehicles 120 of FIG. 2) may be activated. The one or more vehicles may, for example, include a gateway vehicle (e.g., gateway vehicle 160 of FIG. 2).

In operation 210, a backhaul connection (e.g., backhaul connection 52 of FIG. 2) between a vehicle communication system (e.g., using backhaul system 50 of FIG. 1) associated with the gateway vehicle and a cellular infrastructure (e.g., cellular infrastructure 80 of FIG. 2) may be established.

In operation 220, signals (e.g., signals 110 of FIG. 2) from the cellular infrastructure may be received at the vehicle communication system (e.g., received using radio access system 40 of FIG. 1) associated with gateway vehicle. Radio access system 40 may, for example, be or may include femto cell(s) (e.g., femto cell(s) 42 of FIG. 1), Wi-Fi access point(s) (e.g., Wi-Fi access point(s) of FIG. 1), or other systems or devices.

In operation 230, the vehicle communication system associated with the gateway vehicle may, for example, transmit the signals received from the cellular infrastructure.

In operation 240, the vehicle communication system associated with the gateway vehicle may, for example, receive signals from one or more mobile devices (e.g., mobile devices 90 of FIG. 2).

In operation 250, the signals received from the one or more mobile devices may be transmitted to the cellular infrastructure.

In operation 260, the signals received from the one or more mobile devices may be transmitted to the cellular infrastructure using an alternative backhaul connection such as a Wi-Fi, smart grid, femto cell or other backhaul connection or link.

Other or different series of operations may be used.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method comprising:
    activating a plurality of vehicle communication systems associated with a plurality of vehicles, wherein the activating the plurality of vehicle communication systems comprises:
        determining, by a network management system, based on one or more vehicle owner policies associated with the plurality of vehicle communication systems whether to activate the plurality of vehicle communication systems; and activating, if the one or more vehicle owner policies is not be violated, the plurality of vehicle communication systems; and
        activating, if an operator network capacity and load necessitate additional coverage, the plurality of vehicle communication systems, according to the operator network;
    determining a gateway vehicle as a vehicle of the plurality of vehicles having a strongest backhaul link;
    establishing a backhaul connection by a backhaul hardware module of the vehicle communication system associated with the plurality of vehicle communication systems with the gateway vehicle, between the vehicle communication system associated with the gateway vehicle and a cellular infrastructure, wherein said backhaul connection is operative to aggregate data from the plurality of vehicles;
    receiving signals from the cellular infrastructure at the vehicle communication system associated with the gateway vehicle;
    transmitting, using the vehicle communication system associated with the gateway vehicle, the signals received from the cellular infrastructure;
    receiving signals from one or more mobile devices at the vehicle communication system associated with the gateway vehicle; and
    transmitting, using the vehicle communication system associated with the gateway vehicle, to the cellular infrastructure using the backhaul connection, the signals received from the one or more mobile devices.

2. The method of claim 1, wherein:
    transmitting, using the vehicle communication system associated with the gateway vehicle, the signals received from the cellular infrastructure comprises:
    transmitting signals from the vehicle communication system associated with gateway vehicle to the plurality of vehicle communication systems associated with the plurality of vehicles;
    receiving, at the one or more mobile devices, signals transmitted by the gateway vehicle via one or more vehicle communication systems associated the plurality of vehicles; and
    receiving signals from the one or more mobile devices at the vehicle communication system associated with the gateway vehicle comprises:
    receiving, at the vehicle communication system associated with the gateway vehicle, signals from one or more mobile devices transmitted via the plurality of vehicle communication systems associated with the plurality of vehicles.

3. The method of claim 1, wherein transmitting, using the vehicle communication system associated with the gateway vehicle, to the cellular infrastructure the signals received from the one or more mobile devices comprises:
    aggregating the signals from the one or more mobile devices; and transmitting the aggregated signals from the vehicle communication system associated with the gateway vehicle to the cellular infrastructure.

4. The method of claim 1, wherein activating the of the plurality of vehicle communication systems associated with one or more of the plurality of vehicles comprises determining based on one or more vehicle battery levels whether to activate the one or more plurality of vehicle communication systems.

5. The method of claim 1, wherein the plurality of vehicle communication systems associated with the plurality of vehicles comprise a self organizing network.

6. The method of claim 1, wherein the plurality of vehicle communication systems associated with the plurality of vehicles comprises:
    a radio access system to transmit signals to and receive signals from the one or more mobile devices and the plurality of vehicle communication systems associated with the plurality of vehicles; and
    a backhaul system to provide the backhaul connection to the cellular infrastructure and to transmit signals to and receive signals from the cellular infrastructure.

7. The method of claim 6, wherein the radio access system comprises one or more femto cells.

8. A system comprising:
    a backhaul hardware module, to;
    establish a backhaul connection between a vehicle communication system associated with a vehicle and a cellular infrastructure, wherein the backhaul connection is operative to aggregate data from a plurality of vehicles; and
    a processor to:
    activate a plurality of vehicle communication systems associated with the plurality of vehicles, wherein to activate the plurality of vehicle communication systems comprises:
        determining, by a network management system, based on one or more vehicle policies associated with the plurality of vehicle communication systems whether to activate the plurality of vehicle communication systems; and activating, if the one or more vehicle owner policies is not be violated, the plurality of vehicle communication systems; and
        activating, if an operator network capacity and load necessitate additional coverage, the plurality of vehicle communication systems, according to the operator network;
    determine a gateway vehicle as a vehicle of the plurality of vehicles having a strongest backhaul link;
    receive signals from the cellular infrastructure at the vehicle communication system associated with the gateway vehicle;
    transmit, using the vehicle communication system associated with the gateway vehicle, the signals received from the cellular infrastructure using the backhaul connection;
    receive signals from one or more mobile devices at the vehicle communication system associated with the gateway vehicle; and
    transmit, using the vehicle communication system associated with the gateway vehicle, to the cellular infrastructure, using the backhaul connection, the signals received from the one or more mobile devices.

9. The system of claim 8, wherein to:
transmit, using the vehicle communication system associated with the gateway vehicle, the signals received from the cellular infrastructure the processor is to:
- transmit signals from the vehicle communication system associated with gateway vehicle to vehicle communication systems associated with the plurality of vehicles; and
- receive, at the one or more mobile devices, signals transmitted by the gateway vehicle via the plurality of vehicle communication systems associated with the plurality of vehicles;

receive signals from the one or more mobile devices at the vehicle communication system associated with the gateway vehicle the processor is to:
- receive, at the vehicle communication system associated with gateway vehicle, signals from the one or more mobile devices transmitted via the plurality of vehicle communication systems associated with the plurality of vehicles.

10. The system of claim 8, wherein to transmit signals from the vehicle communication system associated with the gateway vehicle to the cellular infrastructure the processor is to:
- aggregate the signals from the one or more mobile devices transmitted via vehicle communication systems associated with the plurality of vehicles; and
- transmit the aggregated signals from the vehicle communication system associated with the gateway vehicle to the cellular infrastructure.

11. The system of claim 8, wherein to activate the plurality of vehicle communication systems associated with the plurality of vehicles, wherein the one or more vehicles comprises the gateway vehicle the processor is to determine based on one or more vehicle battery levels whether to activate the one or more of plurality of vehicle communication systems.

12. The system of claim 8, wherein the processor is to deactivate one or more the plurality of vehicle communications systems if a battery level associated with the of plurality of vehicle communication systems is below a pre-defined threshold.

13. The system of claim 8, wherein the plurality of vehicle communication systems associated with the plurality of vehicles comprise:
- a radio access system to transmit signals to and receive signals from the one or more of mobile devices and the plurality of vehicle communication systems associated with the plurality of vehicles; and a
- backhaul system to establish the backhaul connection to the cellular infrastructure and to transmit signals to and receive signals from the cellular infrastructure.

14. The system of claim 8, wherein the cellular infrastructure comprises a dedicated communication hub.

15. The system of claim 13, wherein the radio access system comprises one or more wireless access points.

* * * * *